United States Patent [19]

Riedel

[11] 4,343,703

[45] Aug. 10, 1982

[54] APPARATUS FOR CLEANING THE INTERIOR FACES OF PIPES OR TUBES

[75] Inventor: Erich O. Riedel, Haan, Fed. Rep. of Germany

[73] Assignee: Riedel-Technik GmbH, Haan, Fed. Rep. of Germany

[21] Appl. No.: 205,543

[22] Filed: Nov. 10, 1980

[30] Foreign Application Priority Data

Nov. 9, 1979 [DE] Fed. Rep. of Germany ....... 2945286

[51] Int. Cl.$^3$ .............................................. B01D 29/02

[52] U.S. Cl. .................................... 210/391; 210/402; 210/446

[58] Field of Search ............... 210/359, 388, 391, 398, 210/435, 446, 448, 498, 499, 402

[56] References Cited

U.S. PATENT DOCUMENTS

| | | | |
|---|---|---|---|
| 603,120 | 4/1898 | Worthington | 210/498 X |
| 3,794,164 | 2/1974 | Ginaven | 210/499 X |
| 3,833,123 | 9/1974 | Walker | 210/499 X |
| 4,246,998 | 1/1981 | O'Ffill | 210/499 X |

*Primary Examiner*—John Adee

*Attorney, Agent, or Firm*—Allison C. Collard; Thomas M. Galgano

[57] ABSTRACT

An apparatus for cleaning the inside faces of pipes or tubes from foreign particles adhering thereto by means of flexible cleaning elements which are oversized relative to the pipe inside diameter to be cleaned, and which are forced through the pipes under hydraulic pressure. The invention is characterized by the fact that a screen is disposed in a casing in such a way that the sieve element is inclined in two different degrees of freedom relative to the centerline of the incoming liquid stream.

6 Claims, 3 Drawing Figures

APPARATUS FOR CLEANING THE INTERIOR FACES OF PIPES OR TUBES

The present invention relates to an apparatus for cleaning the inside faces of pipes from foreign particles sticking thereto, by means of flexible cleaning elements which are oversized relative to the pipe inside diameter to be cleaned, and which are forced through the pipes under hydraulic pressure.

Apparatus of the above-defined type are widely used in processing technology. Their range of applications extends from the cleaning of pipes carrying beverages, for instance beer, to the cleaning of heat exchanger tubes, as well as the cleaning of pipes carrying liquid cement.

The purpose of all of these uses is to free the inside faces of such pipes or tubes from adhering foreign particles or deposits by mechanical abrasion.

The use of such cleaning elements which are normally of a rotatable configuration and, preferably of a spherical shape, is intermittent or also continuous.

When official inspection routines so require, or the operating state of such pipe or tube systems indicates that the inside wall faces of such pipes or tubes are affected by deposits, a cleaning treatment is effected. In a condenser cleaning system, for example, flexible cleaning elements are introduced into the condenser inlet (cooling water inlet) via a sluice. This applies to the intermittent type of cleaning process, but a large number of such systems operate continuously.

Since the specific gravity of such flexible cleaning elements should substantially conform to that of the cooling water for the sake of uniform distribution in condenser plants, the cleaning elements enter the cooling tubes via the cooling water inlet, from where they are forced through the tubes under hydraulic pressure. Consequently, the deposits are separated from the tube walls, and are pushed along in front of these flexible cleaning elements and into the condenser outlet, on the downstream side of which separation, between the cooling water and the cleaning elements, is effected. A so-called "screen apparatus" is used for this purpose which normally comprises one screen area or a plurality of screen faces in a cylinder. These screen faces consist of so-called "bar grids" in which the bars are disposed at spacings from 6 to 12 mm. Where only one screen face is adopted, the same would be installed with such a slope inside the cylinder, that the cleaning elements are directed to an outlet opening in the lowest position of the screen, and are drawn off by suction from that location.

Where several screen faces are provided, they would be arranged in an inclined relationship with respect to each other, forming a port or channel in which the cleaning balls accumulate.

Further bar grids opening into a pipeline which, in turn, is connected to a pump system, are often provided in extension of said screen elements. The mixture composed of flexible cleaning elements and residual water will travel into a pump, from which the cleaning bodies are displaced into a collecting tank ready for reuse.

If the permeability of the screen faces herebefore described is essentially affected by impurities carried by the cooling water, they are, of course, then in need of cleaning. This is done after turning the screen elements so that they are flushed from their rear faces and/or backwashed.

A major drawback affecting the prior art apparatus resides in that the water stream hitting the screen face is distributed in two directions only, one of these directions being defined by vertical passage of cooling liquid through the bar grid, and the other direction being substantially defined by the side component resulting from the inclination of the bar grid section. Yet, it would be advantageous, in terms of maximum performance within a minimum area or space, to split the water stream into several components, since this is the only way to optimize the displacement behavior of the cleaning elements, even where greater water volumes are involved.

It is an object of this present invention to provide a screen apparatus which permits high performance to be achieved within a minimum area, and which eliminates the drawbacks previously described, the crucial point being a favorable distribution of the liquid stream loaded with flexible cleaning elements.

According to the present invention, this problem is solved by using an apparatus for cleaning the inside faces of pipes or tubes from foreign particles adhering thereto, by means of flexible cleaning elements which are oversized relative to the pipe inside diameter to be cleaned, and which are forced through the pipes under hydraulic pressure. The invention is characterized by the fact that a screen is disposed in a casing in such a way, that the sieve element is inclined in two different degrees of freedom, relative to the centerline of the incoming liquid stream.

The screen faces or sections are jointly rotatable on a pivot in one degree of freedom (displacement of a mass point on a curvature, a circle in this case), so that their rear faces can be impinged by the liquid stream.

The term "degree of freedom" as used herein shall mean that a face uniformly inclined relative to one horizontal plane has one degree of freedom, while inclination under two angles results in two degrees of freedom.

Other objects and features of the present invention will become apparent from the following detailed description when taken in connection with the accompanying drawings which disclose several embodiments of the invention. It is to be understood that the drawings are designed for the purpose of illustration only, and are not intended as a definition of the limits of the invention.

In the drawings, wherein similar reference characters denote similar elements throughout the several views.

Figure 1:
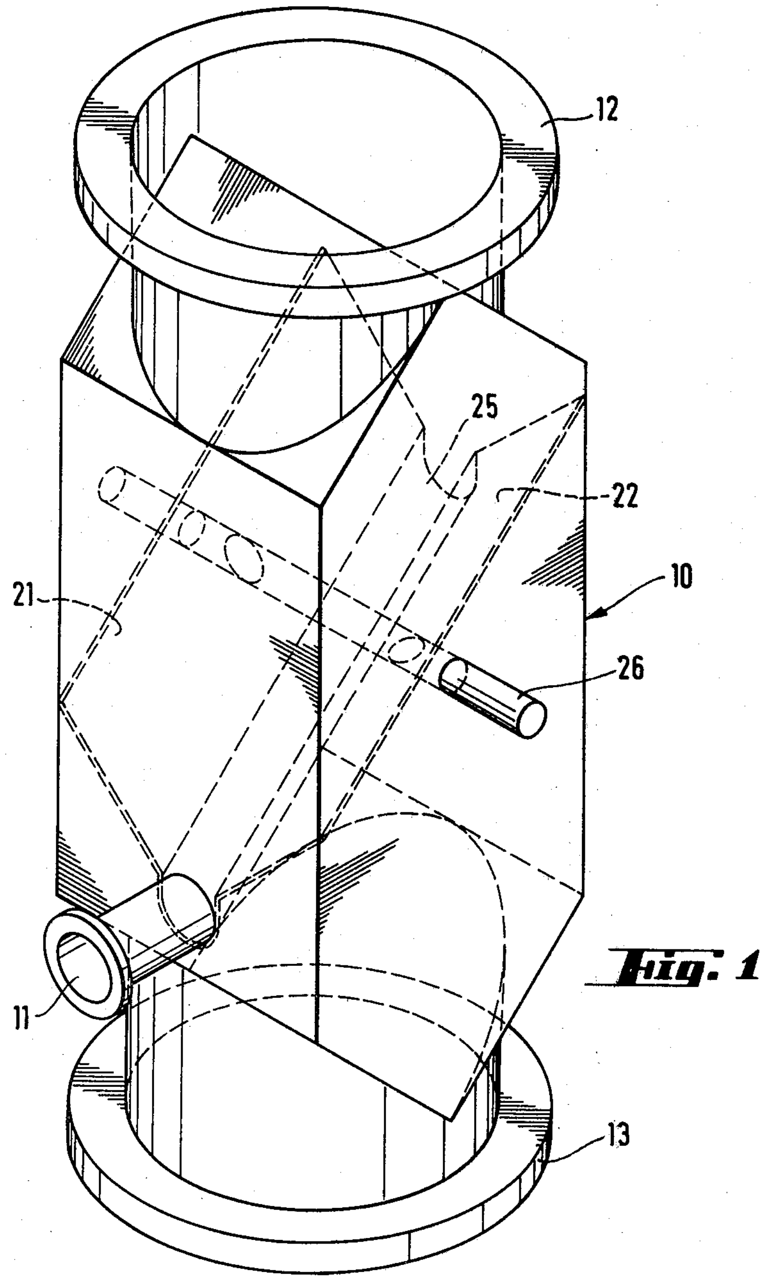
FIG. 1 is a perspective view of an apparatus embodying the present invention, having a V-like screen arrangement disposed in a cube having acute-angled head and base faces.
Figure 2:
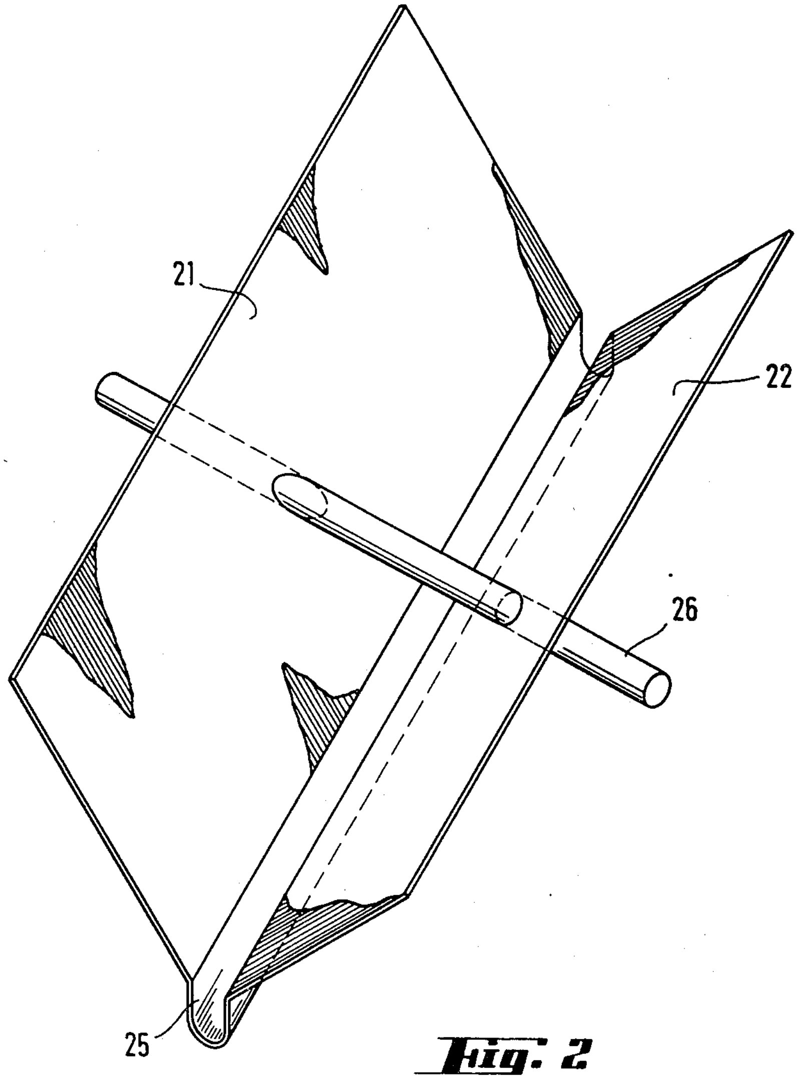
FIG. 2 is an enlarged perspective view of the V-screen with its central port, also schematically-illustrating the striking and distributing liquid stream.

Referring now in detail to the drawings, FIG. 1 shows the apparatus of the present invention disposed in an enclosure having the cross-sectional configuration of a cube 10, while FIG. 2 represents in closer detail the screen faces 21, 22 which define therebetween a port 25 which opens into an outlet 11. The screen composed of faces 21, 22 is pivotable by means of a pivot 26 inside said enclosure.

It is an essential feature of this invention that the screen faces 21, 22 are inclined in more than just one plane, relative to the centerline of the liquid stream.

These planes are characterized as degrees of freedom and, as shown in FIG. 2, subdivide the liquid stream in more than two planes, thereby directing the mixture composed of cleaning elements and liquid toward the outlet in an optimal way. At the same time, it is possible to install a free screen area of essentially larger size inside an enclosure with a given cross section, so that the specific screen load and the contact pressure of the cleaning elements against the screen surface are reduced. This essentially improves the discharge behavior of said cleaning elements.

Figure 3:
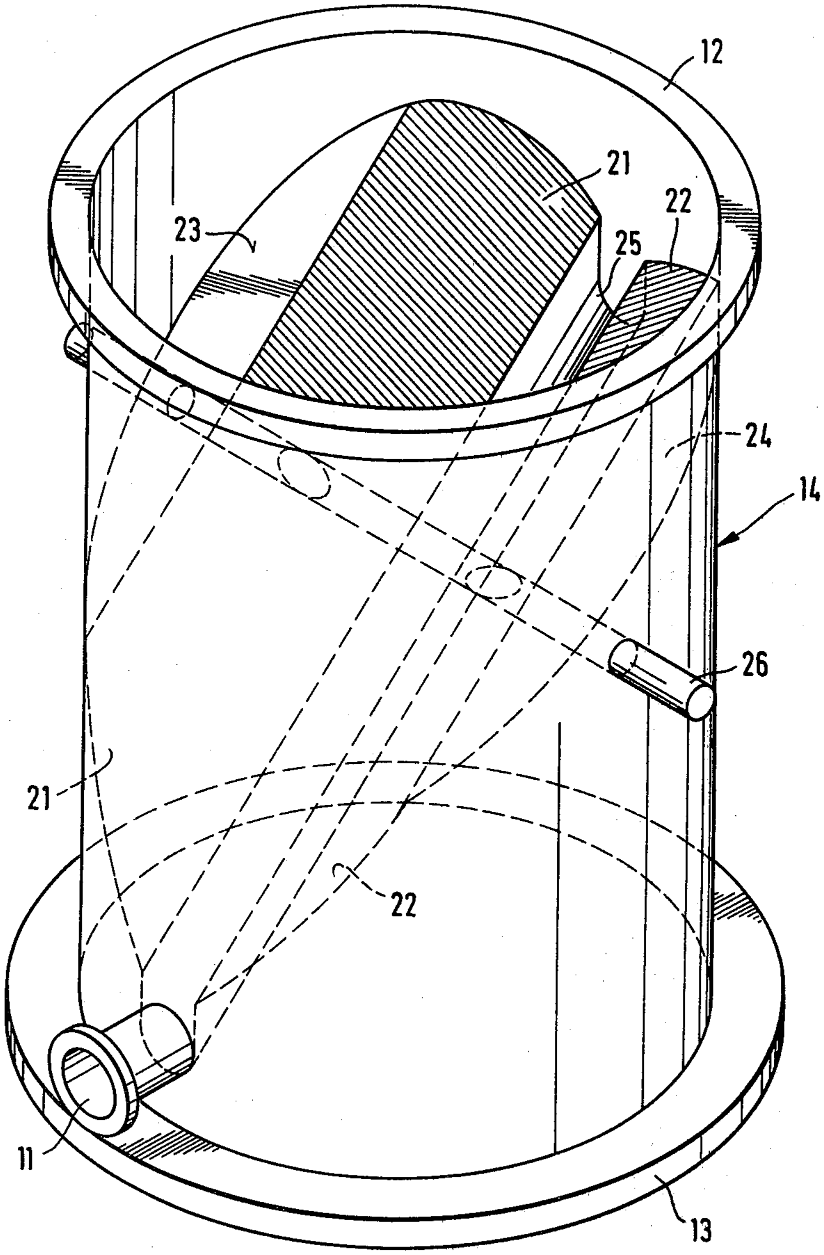
FIG. 3 is a perspective view of an alternate embodiment of the invention, showing a V-screen in a cylindrical vessel.

As can be seen from FIG. 3, the apparatus according to the present invention can also be arranged inside a cylindrical enclosure 14. Cylindrical enclosure 14 is provided with an inlet flange 12 and an outlet flange 13.

In order to provide a simple screen design in this case, the longitudinal sides of each screen element are rectilinear. Fitting faces 23, 24 on either side are in firm communication with the inside wall of the enclosure, for tight connection to said cylindrical casing.

Thus, while only several embodiments of the present invention have been shown and described, it will be obvious that many changes and modifications may be made thereunto, without departing from the spirit and scope of the invention.

What is claimed is:

1. An apparatus for cleaning the inside faces of pipes from foreign particles sticking thereto by means of flexible cleaning elements which are oversized relative to the pipe inside diameter to be cleaned, and which are forced through the pipes under hydraulic pressure, comprising:

an enclosure having a fluid inlet and an opposite fluid outlet and a cleaning element outlet port disposed therebetween; and an elongated, generally V-shaped screen body having two screen faces disposed inside said enclosure at an acute angle relative to the centerline of the incoming liquid stream, said screen body also having a longitudinal axis obliquely disposed relative to the throughflow direction of said liquid stream, and a lower end alignable with said outlet port.

2. The apparatus according to claim 1, wherein said screen body is pivotably mounted in said enclosure by means of a pivot shaft which extends through said screen faces and which is rotatably supported by its ends in said enclosure to permit pivoting of said screen body and said screen faces thereof such that their rear surfaces can be impringed by the liquid stream.

3. The apparatus according to claims 1 or 2, wherein said enclosure is a cube with acute-angled head and base faces on which inlet and outlet flanges are arranged.

4. The apparatus according to claim 1, wherein said enclosure has an inside wall, and wherein said screen has fitting faces associated therewith which are disposed close to said wall of said enclosure, and whose outer curvature is adapted to said inside wall of said enclosure and is in tight communication therewith.

5. The apparatus according to claim 1, wherein said screen faces, along their proximal longitudinal sides, define a channel therebetween which serves as a port.

6. The apparatus according to claim 1, wherein said screen faces are joined together by means of a channel-shaped trough alignable with said outlet port.

* * * * *